(12) United States Patent
Chen et al.

(10) Patent No.: US 10,358,080 B2
(45) Date of Patent: Jul. 23, 2019

(54) VEHICLE EXTERIOR DEVICE AND VEHICLE LIGHT

(71) Applicant: WINBO-DONGJIAN AUTOMOTIVE TECHNOLOGY CO., LTD., Foshan, Guangdong Province (CN)

(72) Inventors: Changbiao Chen, Foshan (CN); Weiting He, Foshan (CN); Jie Yang, Foshan (CN)

(73) Assignee: WINBO-DONGJIAN AUTOMOTIVE TECHNOLOGY CO., LTD., Foshan, Guangdong Province (CN)

( * ) Notice: Subject to any disclaimer, the term of this patent is extended or adjusted under 35 U.S.C. 154(b) by 0 days.

(21) Appl. No.: 15/695,994

(22) Filed: Sep. 5, 2017

(65) Prior Publication Data

US 2018/0361909 A1    Dec. 20, 2018

(30) Foreign Application Priority Data

Jun. 15, 2017   (CN) .......................... 2017 1 0452000

(51) Int. Cl.
  *B60Q 1/04*   (2006.01)
  *F21V 17/02*  (2006.01)
  *F21V 3/00*   (2015.01)
  *F21V 15/01*  (2006.01)

(52) U.S. Cl.
  CPC .............. *B60Q 1/0483* (2013.01); *F21V 3/00* (2013.01); *F21V 15/01* (2013.01); *F21V 17/02* (2013.01)

(58) Field of Classification Search
  CPC ...... B60Q 1/0483; B60Q 1/2611; B60Q 1/52; F21K 9/272; F21K 9/275; F21V 15/01; F21V 17/02; F21V 17/06; F21V 19/0045; F21V 19/0075; F21V 19/02; F21V 21/14; F21V 21/28; F21V 21/34; F21V 3/00; F21Y 2103/10
  See application file for complete search history.

(56) References Cited

U.S. PATENT DOCUMENTS

| 6,428,183 B1* | 8/2002 | McAlpin ................... F21S 8/06 362/147 |
| 6,609,813 B1* | 8/2003 | Showers ................... F21V 3/00 362/223 |
| 7,468,656 B1* | 12/2008 | Frank .................... B60Q 1/0082 340/468 |
| 8,192,063 B2* | 6/2012 | Neufeglise ............... B60Q 1/52 362/249.11 |
| 9,604,566 B1* | 3/2017 | Huang ................. B60Q 1/2611 |
| 2006/0231326 A1* | 10/2006 | Iwayama ............... H04R 1/025 181/150 |
| 2009/0161371 A1* | 6/2009 | Vukosic ............... B60Q 1/2611 362/373 |

(Continued)

*Primary Examiner* — Zheng Song
(74) *Attorney, Agent, or Firm* — Cheng-Ju Chiang

(57) ABSTRACT

The present a vehicle exterior device and vehicle light, wherein the vehicle exterior device includes a body defining a chamber adapted to receive the light unit; a support received in the chamber and fixed with the body, wherein the support is configured to be connected to the light unit. By providing a chamber on the body and fixing the support in the chamber, it is possible to hide a light element in the chamber and fix it with the body such that the light element may be prevented from being touched by outside damage.

14 Claims, 4 Drawing Sheets

(56) References Cited

U.S. PATENT DOCUMENTS

| | | | |
|---|---|---|---|
| 2012/0243217 A1* | 9/2012 | Szprengiel | F21S 8/043 362/223 |
| 2014/0268845 A1* | 9/2014 | Davis | B60Q 1/2661 362/492 |

* cited by examiner

VEHICLE EXTERIOR DEVICE AND VEHICLE LIGHT

CROSS REFERENCE TO RELATED APPLICATIONS

This application claims priority to Chinese Patent Applications No. 201710452000.9 filed on Jun. 15, 2017, which is hereby incorporated by reference herein as if set forth in its entirety.

TECHNICAL FIELD

The present disclosure generally relates to the automotive accessory field, and in particular relate to a vehicle exterior device and vehicle light.

BACKGROUND

Light elements are usually used in the decoration of vehicles. Conventionally the light elements are mounted on a vehicle exterior device such as the bumper, the luggage rack or the roll cage, and exposed outside. As a result, the degradation of the light elements may soon occur due to collisions, rain and other outside damage.

In addition, the mounting positions of elements on the vehicle exterior device are usually fixed. For example the mounting positions may refer to two holes and the light element may be mounted on the vehicle by screwing two sides of the light element in the holds. Consequently if one wants to change another light element with a different size, new fixing holes have to be drilled, which is quite inconvenient to the user.

DETAILED DESCRIPTION

The disclosure will now be described in detail with reference to the accompanying drawings and examples.

Figure 1:
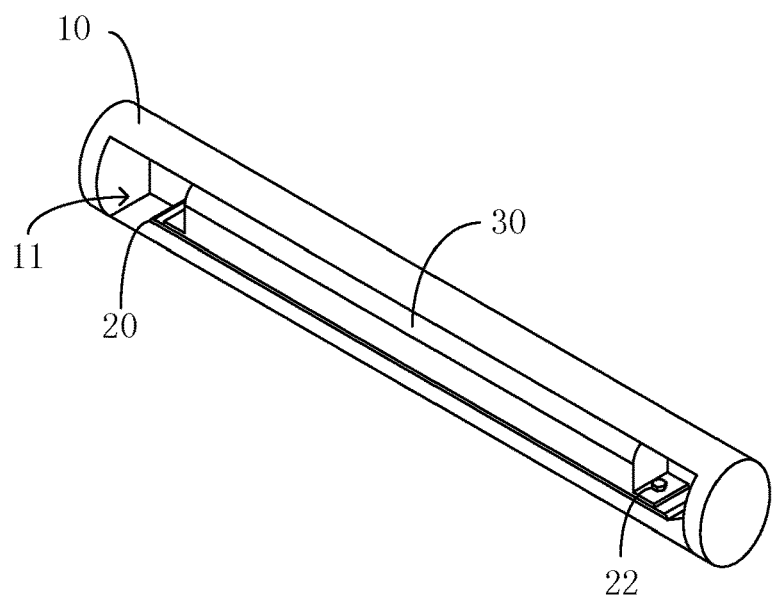
FIG. 1 is a perspective, assembled view of a vehicle exterior device with a light unit according to an embodiment of the present disclosure.
Figure 2:
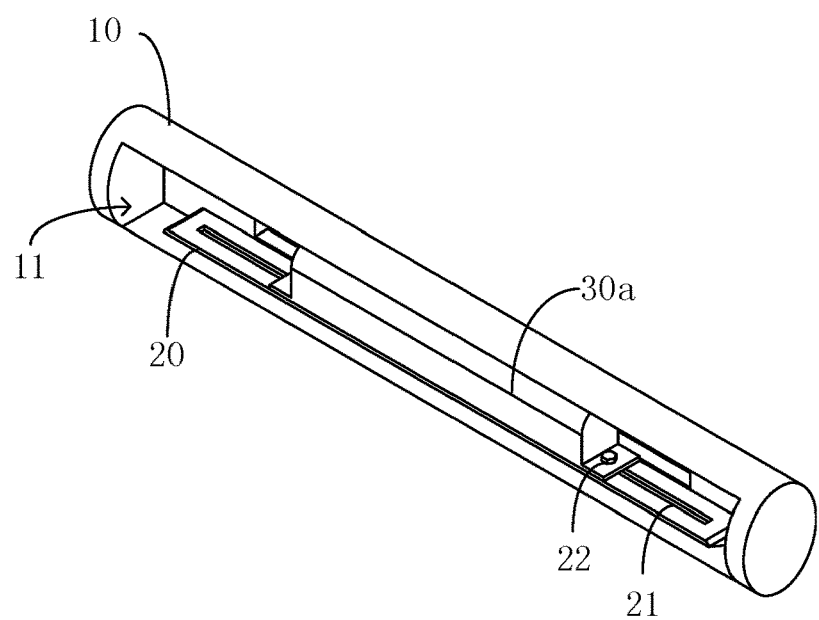
FIG. 2 shows the vehicle exterior device of FIG. 1 assembled with another light unit.

Referring to FIG. 1 and FIG. 2, a structure schematic diagram of a vehicle exterior device according to an embodiment of the present disclosure is depicted.

The vehicle exterior device may include a body 10 and a support 20. The vehicle exterior device may be adapted to be mounted on a vehicle to receive a light unit 30. The vehicle exterior device may refer to a bumper, a luggage rack, a roll cage or other accessory equipment installed outside a vehicle. The vehicle may refer to a car, a bus, a truck or other types of vehicle.

In this embodiment, the body 10 may be a tube structure having a cylindrical configuration. For example, the body 10 may refer to part of a luggage rack or a roll cage. The body 10 defines a chamber 11 at one side which provides enough space for installing the support 20 and the light unit 30. Optionally, the support 20 may be screwed onto the body 10. The light unit 30 may be mounted on the support 20 by a pair of mounting members 22 extending through the support 20. The mounting members 22 may be located at two ends of the light unit 30.

By providing the chamber 11 in the body 10 and fixing the support 20 in the chamber 11, it is possible to hide the light unit 30 in the chamber 11 and fix it with the body 10 such that the light unit 30 may be prevented from being touched by outside damage.

In some embodiments, the support 20 may define an elongated slot 21 extending along a first direction corresponding to an extending direction of the light unit 30 or 30a, as shown in FIG. 2. The support 20 may include a pair of mounting members 22 extending through the elongated slot 21 in two different positions based on the length of the light unit 30 or 30a. Thus, the mounting members 22 may be located different positions of the elongated slot 21 based on different length of the light unit 30 or 30a. The mounting members 22 may refer to bolts, screws or other components having the same function. If a long light unit 30 is installed, the mounting members 22 may be fixed close to the ends of the support 20 as shown in FIG. 1. If a relatively short light unit 30a is installed, the mounting members 22 may be fixed closer to the center of the support 20, which is adapted to the length of the light unit 30a.

An advantageous effect of the present disclosure is that the exterior device may be utilized to be mounted with light units 30a with different lengths, and it is not necessary to re-machine a new mounting position when a new light unit with a different length is to be changed.

Figure 3:
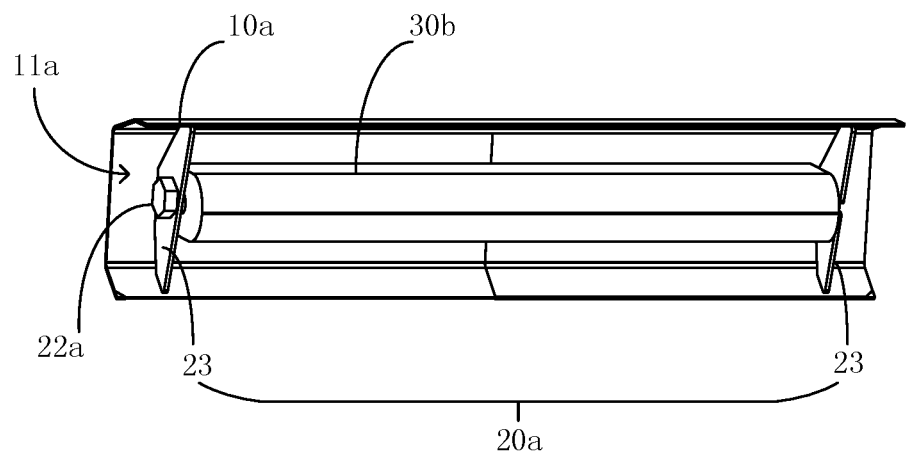
FIG. 3 is an isometric, assembled view of a vehicle exterior device according to another embodiment of the present disclosure.

Referring to FIG. 3, an isometric, assembled view of a vehicle exterior device according to another embodiment of the present disclosure is depicted.

The body 10a of the vehicle exterior device may include a plurality of sheets connected together to define the chamber 11a. For example, the exterior device may refer to part of a bumper of the vehicle. The support 20a may include a pair of supporting members 23 assembled on the body 10a and configured to be located in two different positions based on the length of the light unit 30b so as to support the light unit 30b. The supporting members 23 may refer to metal plates having a configuration corresponding to the shape of the chamber 11a and a thickness large enough to hold the light unit 30b.

A pair of mounting members 22a may be utilized to fix the two ends of the light unit 30b on the supporting members 23. In some embodiments, the supporting members 23 may be welded on the body 10a and in this condition the light unit 30b may have a corresponding length so as to be installed properly.

Figure 4:
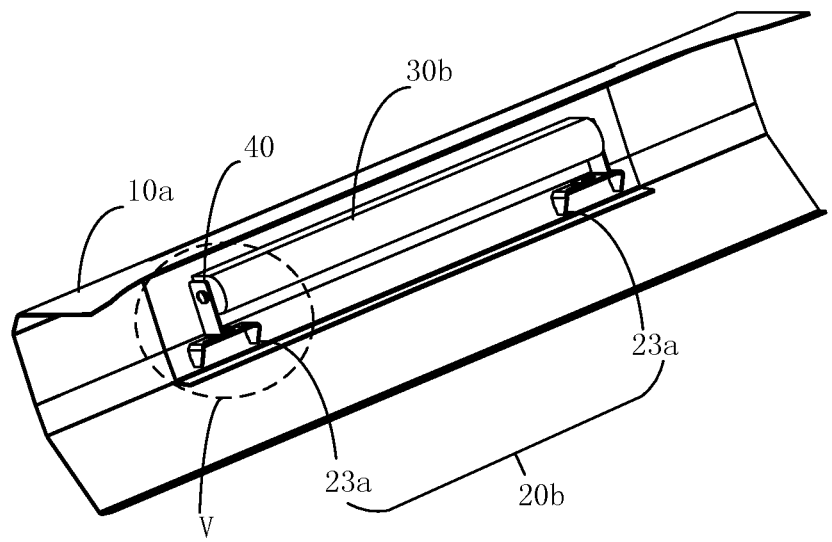
FIG. 4 is an isometric, assembled view of a vehicle exterior device according to an embodiment of the present disclosure.
Figure 5:
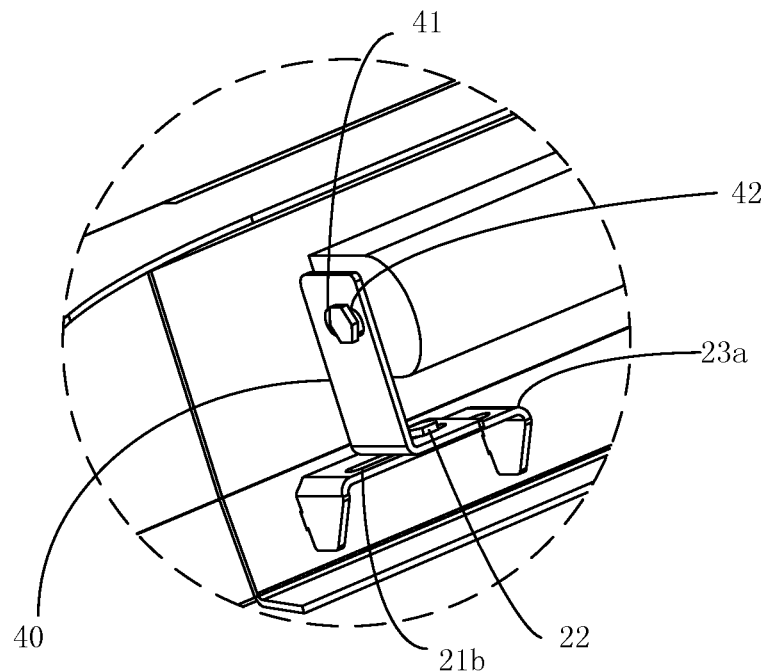
FIG. 5 is an enlarged view of the circle portion V of FIG. 4.

Referring to FIG. 4 and FIG. 5, FIG. 4 is an isometric, assembled view of a vehicle exterior device according to an embodiment of the present disclosure. FIG. 5 is an enlarged view of the circle portion V of FIG. 4.

The support 20b may include a pair of separated supporting members 23a assembled on the body 10a and configured to be located in two different positions based on the length of the light unit 30*b* so as to support the light unit 30*b*. In some embodiments, the supporting members 23*a* may be detachably mounted on the body 10*a* so that the mounting positions of the supporting members 23*a* may be adjusted to meet the length of the light unit 30*b*. Each of the supporting members 23*a* may define a first slot 21*b* along a first direction corresponding to the extending direction of the light unit 30*b*.

The vehicle exterior device may further include a pair of connection elements 40. The connection elements 40 may be respectively mounted on the two separated supporting members 23*a*. Each of the connection elements 40 may include a horizontal portion mounted on the supporting member 23*a* by extending a mounting member 22 through the first slot 21*b* and the horizontal portion, and a vertical portion mounted on a side of the light unit 30*b*. The vertical portion of the connection element 40 may define a second slot 41 extending along a second direction substantially perpendicular to the first direction. A pair of fixing members 42 may extend respectively through the second slot 41 of the connection elements 40 to be connected to two opposite ends of the light unit 30*b*.

By the provision of the first slot 21*b*, the mounting position of the connection element 40 on the supporting member 23*a* may be adjustable along the first direction so as to fit light units with different lengths. By the provision of the second slot 41, the mounting position of the fixing member 42 on the connection element 40 may also be adjustable along the second direction so as to fit light units with different thickness and to obtain better light decoration effect. It is to be understood that the first slot and the second slot 41 may be replaced by other structure having a similar function. For instance multiple screw holes arranged along a certain direction may also provide several mounting positions, and a chuck slidably engaged with the supporting member 23*a* and fixed with the connection element 40 may also achieve the adjustment of position of the connection element 40.

An advantageous effect of the present disclosure is that the installation position of a light element on the support 20*b* is adjustable along the first direction and the second direction so that the vehicle device may be suitable for light elements with different sizes. Consequently, it is quite convenient to replace a light element for another one with different sizes on the device.

Figure 6:
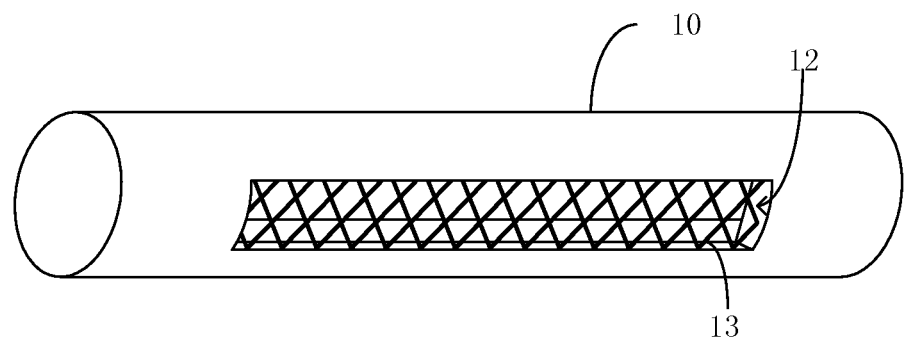
FIG. 6 is the vehicle exterior device of FIG. 1, but shown from another side.

Referring to FIG. 6, FIG. 6 is the vehicle exterior device of FIG. 1, but shown from another side.

In some embodiments, the body 10 may include a window 12. The window 12 is located at the opposite side of the chamber (not shown) and communicated with the chamber so as to let light out of the body 10 through the window 12 when the light unit (not shown) is lighted up.

In some embodiments, the body 10 may also include a protection 13 such as metal net, transparent glass or rigid plastics. The protection 13 may be attached to the window 12 so as to protect the inner structure including especially the light unit from outside damage.

Figure 7:
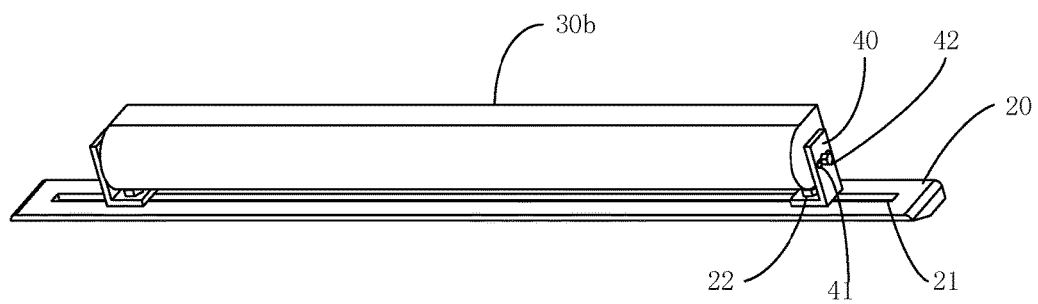
FIG. 7 is a perspective view of a support assembled with a light unit according to an embodiment of the present disclosure.

Referring to FIG. 7, a perspective view of a support assembled with a light unit according to an embodiment of the present disclosure is depicted. In this embodiment, the support 20 may be unitary and similar to that of FIG. 1, wherein the support 20 may define a first slot 21 along a first direction. A pair of connection elements 40 may be respectively mounted in two different positions of the support 20 based on the length of the light unit 30*b*. Similarly, each of the connection elements 40 may include a horizontal portion mounted on the support 20 by extending a mounting member 22 through the first slot 21 and the horizontal portion, and a vertical portion mounted on a side of the light unit 30*b*. The vertical portion of the connection element 40 may define a second slot 41 extending along a second direction substantially perpendicular to the first direction. A pair of fixing members 42 may extend respectively through the second slot 41 of the connection elements 40 to be connected to two opposite ends of the light unit 30*b*.

Figure 8:
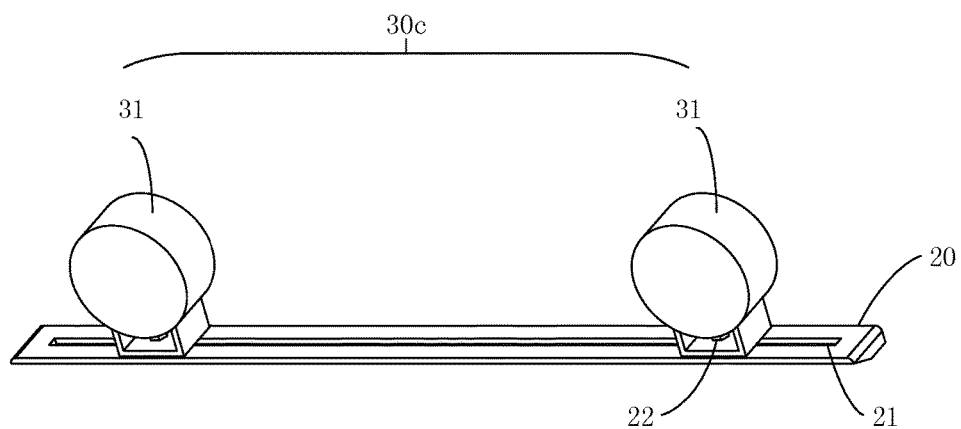
FIG. 8 is a perspective view of a support assembled with a light unit according to another embodiment of the present disclosure.

Referring to FIG. 8, a perspective view of a support assembled with a light unit according to another embodiment of the present disclosure is depicted. In this embodiment, the light unit 30*c* may include two separated lamps 31. Each of the two lamps 31 may be detachably mounted on the support 20 by being connected to one of the two mounting members 22 which extend through the elongated slot 21 in two different positions. And the vehicle exterior device may also be utilized to be mounted with the two separated lamps 31. An advantageous effect of this embodiment is that the distance between of the two lamps 31 may be easily adjusted.

It is to be understood that the above-mentioned technical features may be used in any combination without limitation.

The foregoing is merely embodiments of the present disclosure, and is not intended to limit the scope of the disclosure. Any transformation of equivalent structure or equivalent process which uses the specification and the accompanying drawings of the present disclosure, or directly or indirectly application in other related technical fields, are likewise included within the scope of the protection of the present disclosure.

What is claimed is:

1. A vehicle exterior device adapted to be mounted on a vehicle to receive a light unit, comprising:
    a body defining a chamber adapted to receive the light unit; and
    a support received in the chamber and fixed with the body, wherein the support is configured to be connected to the light unit and comprises two separated supporting members assembled on the body and configured to be located in two different positions based on a length of the light unit so as to support the light unit;
    two connection elements and two fixing members, wherein the two connection elements are respectively mounted on the two separated supporting members; a mounting position of the connection element on the supporting member is adjustable along a first direction configured to substantially correspond to an extending direction of the light unit the two fixing members are respectively mounted on the two connection elements and a mounting position of the fixing member on the connection element is adjustable along a second direction substantially perpendicular to the first direction; and the two fixing members are configured to be connected respectively to two ends of the light unit;
    wherein the supporting member defines a first slot extending along the first direction; the connection element is mounted on the supporting members by extending a mounting member through the first slot and the connection element the connection element defines a second slot extending along the second direction and the fixing member is configured to extend through the second slot to be mounted on the connection element.

2. The vehicle exterior device of claim 1, wherein the support defines an elongated slot extending along a first direction configured to substantially correspond to an extending direction of the light unit; the support comprises two mounting members configured to extend through the elongated slot in two different positions based on a length of the light unit.

3. The vehicle exterior device of claim 1, wherein the body defines a window at an opposite side of the chamber and communicated with the chamber to let light out of the body through the window.

4. The vehicle exterior device of claim 3, further comprising a protection attached to the window.

5. The vehicle exterior device of claim 1, wherein the body has a cylindrical elongated configuration.

6. The vehicle exterior device of claim 1, wherein the body comprises a plurality of sheets connected together to define the chamber.

7. A vehicle exterior device for a light unit, comprising:
a body having a cylindrical configuration and defining a chamber to receive the light unit;
a support received in the chamber and fixed with the body, wherein the support comprises a pair of supporting members assembled on the body and configured to be located in two different positions based on a length of the light unit; the supporting member defines a first slot extending along a first direction configured to correspond to an extending direction of the light unit;
two connection elements, two fixing members and two mounting members, wherein the two mounting members are configured to mount the two connection elements on the two supporting members by extending through the first slot and the connection element; the connection element defines a second slot extending along a second direction substantially perpendicular to the first direction, the fixing members are configured to mount the two connection elements on two opposite ends of the light unit by extending through the second slot.

8. The vehicle exterior device of claim 7, wherein the body defines a window at an opposite side of the chamber and communicated with the chamber to let light out of the body through the window.

9. The vehicle exterior device of claim 8, further comprising a protection attached to the window.

10. A vehicle light, comprising:
a light unit,
a body defining a chamber adapted to receive the light unit; and
a support received in the chamber and fixed with the body, wherein the support is configured to be connected to the light unit and comprise two separated supporting members assembled on the body and configured to be located in two different positions based on a length of the light unit so as to support the light unit;
two connection elements and two fixing members, wherein the two connection elements are respectively mounted on the two separated supporting members; a mounting position of the connection element on the supporting member is adjustable along a first direction configured to substantially correspond to an extending direction of the light unit the two fixing members are respectively mounted on the two connection elements and a mounting position of the fixing member on the connection element is adjustable along a second direction substantially perpendicular to the first direction; and the two fixing members are configured to be connected respectively to two ends of the light unit;
wherein the supporting member defines a first slot extending along the first direction and the connection element is mounted on the supporting members by extending a mounting member through the first slot and the connection element the connection element defines a second slot extending along the second direction and the fixing member is configured to extend through the second slot and the connection element.

11. The vehicle light of claim 10, further comprising two mounting members, wherein:
the support defines an elongated slot extending along a first direction configured to substantially correspond to an extending direction of the light unit;
the two mounting members are configured to extend through the elongated slot in two different positions based on the length of the light unit so as to be fixedly engaged with two opposite ends of the light unit.

12. The vehicle light of claim 11, further comprising two connection elements and two fixing members, wherein:
the two connection elements are mounted on the support respectively by the two mounting members, the connection element defines a second slot extending along a second direction substantially perpendicular to the first direction;
the two fixing members extend respectively through the second slot of the two connection elements to assemble the connection elements and the two opposite ends of the light unit.

13. The vehicle light of claim 11, further a protection, wherein:
the body defines a window at an opposite side of the chamber and communicated with the chamber to let light out of the body through the window;
the protection is attached to the window.

14. The vehicle light of claim 10, further comprising two mounting members, a window and a protection, wherein
the light unit comprises two lamps;
the support defines an elongated slot extending along a first direction configured to substantially correspond to an extending direction of the light unit;
each of the two lamps is detachably mounted on the support by being connected to one of the two mounting members which extend through the elongated slot in two different positions; and
the body defines a window at an opposite side of the chamber and communicated with the chamber to let light out of the body through the window and the protection is attached to the window.

* * * * *